United States Patent
Bowling

[15] 3,681,666
[45] Aug. 1, 1972

[54] ELECTROLYTIC CAPACITOR WITH EXTENDED ELECTRODE FOR SUPPORT IN THE CONTAINER

[72] Inventor: Edward L. Bowling, Broadway, N.C.

[73] Assignee: Cornell-Dubilier Electric Corporation, Newark, N.J.

[22] Filed: July 6, 1971

[21] Appl. No.: 159,873

[52] U.S. Cl. .................................317/230, 317/260
[51] Int. Cl. ...............................................H01g 9/06
[58] Field of Search.....................317/230, 231, 233

[56] References Cited

UNITED STATES PATENTS

| | | | |
|---|---|---|---|
| 3,264,015 | 8/1966 | Mayers | 317/230 X |
| 3,301,270 | 1/1967 | Horn | 317/230 |
| 3,555,370 | 1/1971 | Bowling | 317/230 |
| 3,628,103 | 12/1971 | Bone | 317/230 |

Primary Examiner—James D. Kallam
Attorney—Paul S. Martin

[57] ABSTRACT

An electrolytic capacitor of wound electrodes and a metal container has an extended-foil cathode. The cover of the container is forced against the top of the wound electrolytic capacitor section, and this is transmitted as pressure of the wound section against the bottom of the container. The forced contact of the extended-foil cathode against the metal container promotes efficient heat dissipation which allows an increased ripple-current rating for the electrolytic capacitor. The construction has excellent resistance to shock and vibration without resort to a deposit of potting compound between the wound section and the container bottom.

3 Claims, 1 Drawing Figure

PATENTED AUG 1 1972　　3,681,666
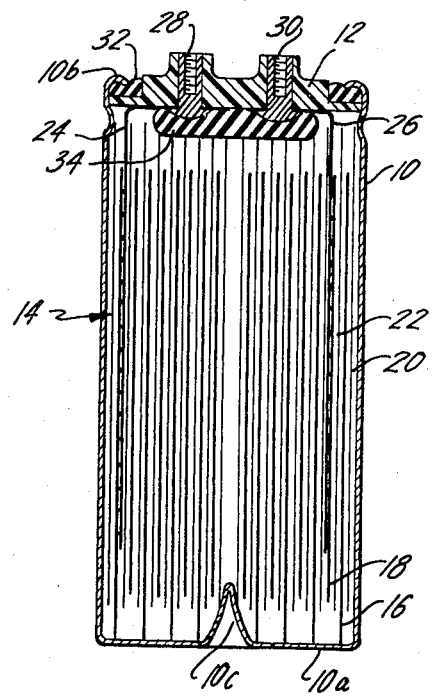

ELECTROLYTIC CAPACITOR WITH EXTENDED ELECTRODE FOR SUPPORT IN THE CONTAINER

This invention relates to electrolytic capacitors.

There has been a long-standing requirement for electrolytic capacitors that they shall survive certain sustained vibration tests. Capacitors that meet this requirement have commonly been anchored in the enclosing container by means of pouring waxes, epoxy resins or other potting compounds. Any such added materials reduce the heat dissipation characteristics of such capacitors, and there is an accompanying reduction in the amount of ripple current for which the capacitors can be rated.

An object of this invention resides in providing a novel capacitor having excellent vibration resistance and a capacitor having, additionally, a notably high ripple-current rating.

In the past, various techniques have been used for preventing the wound section of electrolytic capacitors, impregnated with an electrolyte, from shifting in their enclosing metal container due to mechanical shock or vibration. Any such movement tends to cause fracture of the connections to the would and impregnated capacitor section and in premature failure of the capacitor. Commonly a layer of some form of potting compound, such as epoxy resin, has been poured into the container before the electrolytic section is inserted, to anchor the capacitor section in position. While such an anchor is effective and is commonly used for providing a shock-resisting construction, it is eliminated in the described embodiment of the invention. The wound section has an extended cathode foil which bears against the bottom wall of the metal container. Bearing pressure of the extended-foil electrode against the bottom of the container is developed by application of pressure to the opposite end of the wound section. The cover, bearing at least one terminal, is forced toward the wound section, while the cover is being secured to the top of the container. For better assurance that the initially developed pressure will be sustained, a resilient member is interposed between the cover and the wound section, especially a body or pad of an elastomer. By virtue of the elimination of the poured anchor between the electrolytic capacitor wound section and the bottom of the container, and the pressure contact of the extended-foil electrode against the container bottom, a considerable increase in ripple rating of electrolytic capacitors has been realized, as much as 50 percent increase in some sizes. The capacitor has excellent vibration resistance due to the tight confinement of the impregnated electrolytic capacitor section between the bottom of the container and the terminal-bearing cover that is crimped to the container.

The nature of the invention, including further features of novelty and advantages, will be better appreciated from the detailed description that follows of two embodiments of various aspects of the invention. These embodiments are shown in the accompanying drawings, in which:

The single FIGURE is a longitudinal cross-section of an illustrative form of capacitor embodying various aspects of the invention.

An illustrative form of an electrolytic capacitor is shown as a preferred embodiment of the invention. This includes an aluminum container 10 having a cover 12 of molded insulation containing a wound and impregnated electrolytic capacitor section generally indicated by the numeral 14. This wound section includes cathode 16 of etched aluminum foil, an anodically formed aluminum-foil anode 18, and porous paper separators 20 and 22. Terminal strip 24 is united to cathode foil 16, and terminal strip 26 is united to anode foil 18. Strips 24 and 26 are united to terminal studs 28 and 30, respectively, that extend through and are sealed in insulating cover 12.

The lower edge of cathode foil 16 bears against bottom 10a of the container. The cathode foil extends beyond the edges of separators 20 and 22. Anode foil 18 is recessed relative to the lower edges of the separators and consequently the part of section 14 that projects beyond the rest of the wound section is cathode foil 16. At the top of the wound section, both foils are recessed relative to the top edges of separators 20 and 22.

A body or thick pad 34 of synthetic rubber or other elastomer, or any suitable resilient metal member (arranged so as to avoiding short-circuiting of the terminals) is interposed between the inside of cover 12 and the top of section 14. When the parts are assembled, and after the capacitor section has been impregnated with an electrolyte, great pressure is applied to cover 12 which squeezes body 34 against the top of section 14 and presses the extending edges of foil cathode 16 against bottom 10a of the container. Body 34 is deformed and internally stressed. The edges 10b of the container are spun over a sealing gasket 32 while the pressure on the cover is maintained.

After the cover is in place mechanically and hermetically sealed a lasting end pressure is established on the wound section. That pressure serves two prime purposes. FIrst, it completely prevents movement of the wound section in the container along the axis of the winding and, second, it maintains firm metal-to-metal contact between the bottom 10a of the metal container and the extended edge of cathode foil 16.

The squeeze pressure on the wound section causes interlocking contact of pad 34 with the top of section 14 and with cover 12 and the heads of terminals 28 and 30. Pad 34 thus prevents axial motion of the wound section relative to the container, and it tends to prevent lateral motion, too. Post 10c provides for better assurance against lateral motion of the wound section in the container as a result of vibration. Post 10c is integral with the bottom of the container and is proportioned to have a tight fit in the central passage of the wound section left by the winding mandrel.

The pressure-engagement of the cathode foil against the bottom of the metal container establishes a firm, efficient heat-conduction path. When the capacitor is in use under conditions causing displacement current to flow, notably ripple current when used in filtering rectified alternating current, the resulting losses produce heat. The efficient heat dissipation realized by the firm engagement of the cathode-foil edge with the bottom of the metal can is a highly effective aid in increasing the ripple rating of the capacitor. Compared with a like capacitor having a customary achoring layer of potting compound on the bottom of the container, as much as a 50 percent increase in ripple rating can be realized in some capacitors, with the new construction. The actual percentage increase depends on the physical dimensions.

Foil 16 is a cathode foil as described. This is because it engages the container and makes the container negative, and usually the negative terminal of direct-current supplies is the grounded terminal. However, the cathode could be formed or processed as an anode so as to withstand a small amount of a-c voltage, or it could be made anodic for use in a low voltage alternating-current circuit. It would not be wise to make the container strongly positive (in a grounded-negative circuit), since then insulation on the container would be wanted for safety and any such use of insulating covering on the container could lead to reduction of its heat-dissipation capability.

The area of pad 34 is shown as extending across about 50 percent of the diameter of the capacitor section and this is probably a minimum. It can well occupy the entire top area of the section. The pad should occupy a substantial proportion of the top of the wound section, to accomplish its intended purpose.

A range of variation and varied application of the novel features of the described capacitor will occur to those skilled in the art and consequently the invention should be construed broadly in accordance with its full spirit and scope.

I claim:

1. An electrolytic capacitor, including a metal container having a side wall and a bottom, a cover at the end of the container opposite said bottom, a wound capacitor section in said container, said capacitor section including electrode foils at least one of which is anodically formed, porous dielectric separators between said electrodes, an electrolyte impregnation in said separators, and means providing respective terminal connections to said electrode foils, one of said electrode foils having an edge extending beyond the edges of the other of said electrode foils and said dielectric separators and into contact with the bottom of the metal container, said capacitor having means for applying pressure against the end of the capacitor section nearest the cover and thereby pressing said extending edge of said one foil firmly against said metal container bottom for enhanced heat dissipation, and for resisting endwise displacement of the wound capacitor section in the container in response to mechanical shock.

2. An electrolytic capacitor in accordance with claim 1, wherein said container includes means secure against lateral shift relative to the container and engaging said capacitor section for inhibiting lateral shift of the wound section relative to the container in response to mechanical shocks imposed on said container laterally.

3. An electrolytic capacitor in accordance with claim 1, further including an elastic body in compression between said cover and said wound capacitor section.

* * * * *